INVENTOR
ROBERT E. JASPERSON

INVENTOR
ROBERT E. JASPERSON

ATTORNEYS

AGENT

# United States Patent Office 3,194,949
Patented July 13, 1965

3,194,949
AUTOMATIC ONE-STAR TRACKING
NAVIGATION DEVICE
Robert E. Jasperson, Ferry Farms, Annapolis, Md.
Filed May 8, 1961, Ser. No. 108,681
6 Claims. (Cl. 235—151)
(Granted under Title 35, U.S. Code (1952), sec. 266)

The invention described herein may be manufactured and used by or for the Government of the United States of America for governmental purposes without the payment of any royalties thereon or therefor.

This invention relates to a system for determining both automatically and continuously the geographical position of a vehicle. This system further is adapted to direct the vehicle to a predetermined position along a predetermined route. More particularly this system is designed to overcome the disadvantages found in navigating during daylight conditions when it is impossible or difficult to reference the system on celestial bodies because of the effects and interference of the sun. Instead of trying to overcome this interference this system is designed to take advantage of these effects. This is done by a one-star-tracking system which is adapted to track on the sun during the daylight hours and to track another celestial body when the sun is obscured by the earth.

One object of this invention is to provide a one-star-tracking navigational device which will track continuously over a twenty-four hour period and will in turn convert the tracking information into trigonometric form and combine and convert this information into position data and control information for guiding the vehicle.

Another object of this invention is to provide a one-star-tracking navigation device that determines position from following the sun.

Another object of this invention is to provide a one-star-tracking navigation device having a stabilized platform to hold the tracker stable with relation to earth.

Another object of this system is to provide a daylight hours, sun-tracking navigation device for determining geographic position.

Other objects and many of the attendant advantages of this invention will be readily appreciated as the same become better understood by reference to the following detailed description when considered in connection with the accompanying drawings wherein.

Figure 1:
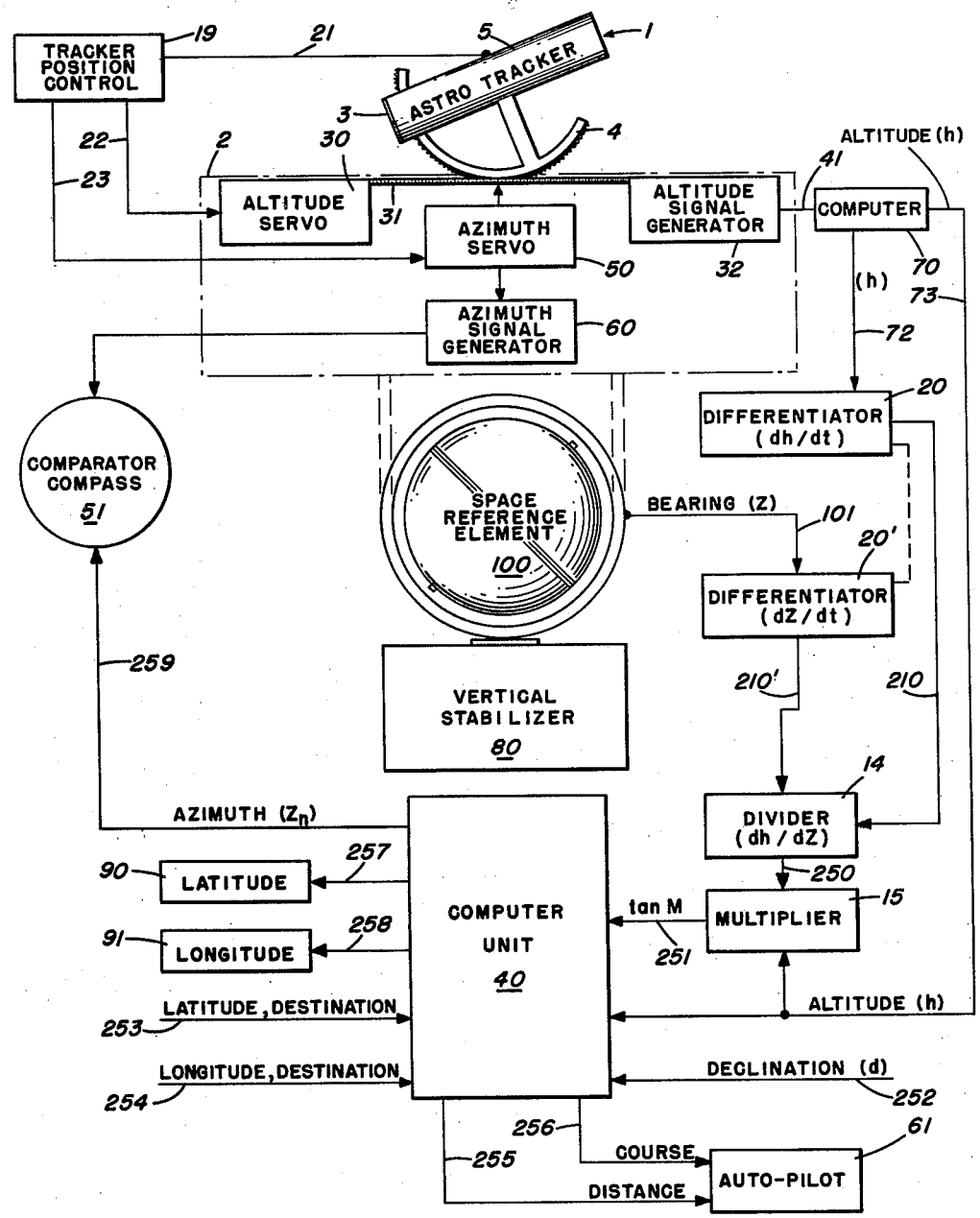
FIG. 1 illustrates the operative system of the embodiment of the invention.

In the embodiment of the invention illustrated in FIG. 1, an astro-tracker 1 is mounted for suitable rotation and movement on a stabilized platform 2. The astro-tracker may take any one of several conventional forms and therefore it has been illustrated in diagrammatic form to facilitate the description of the invention.

The platform is stabilized by a suitable rotating means which is adapted to determine the true vertical to the earth. The means used in the illustrated device operates on the same principle as a radiometric sextant which scans the periphery of the sun to determine the location of the center. In the invention, the radiometric sextant is adapted to scan the periphery of the earth by detecting the absorbed or reflected energy and in this way the true vertical to the earth can be determined to a high degree of accuracy. This in turn overcomes certain limitations found in using a pendulum effect. An imaginary line drawn between the center of the earth and the space vehicle then becomes the true vertical and the plane of the stabilized platform upon which the astro-sextant 1 may be mounted is maintained normal to this line.

The astro-tracker 1 may be of the type which has a sensing area 3 at the rear of the tube 5 which may be divided into four equal segments. Each of these segments has a separate radiation sensing area diametrically opposite each other. The astro-tracker 1 is designed in such a manner that an image of the celestial body being tracked is focused on the sensing area 3 of the tube 5. When the astro-tracker 1 is positioned on the center of the star, the amount of radiation on each of the four sensing areas 3 is equal and four equal signals are sent to tracker position control 19 over the leads 21. Since the signals are equal, no control signal is derived from the tracker position control 19. But as the celestial body and the vehicle move with relation to each other the image at the rear of the tube 3 deviates from the balance position. An unbalanced signal is sent to the tracker position control 19 by means of the leads 21 and control signals are sent over the leads 22 and 23 to the altitude servo 30 or the azimuth servo 50 respectively. When the astro-tracker 1 is again focused on the celestial body the detectors are balanced and the position control signal is cut off and the astro-tracker continues in this direction until further deviation is detected.

As can be seen from FIG. 1 the altitude servo 30 drives a worm gear 31 which coacts with arcuate gear 4 on the astro tracker 1. The other end of the worm gear 31 is attached to a shaft position signal generator 32 which may be an extremely accurate selsyn. The output of this signal generator 32 is connected to the correction computer 70 which provides compensation for the "coriolis effect" of the earth's rotation. Coriolis acceleration is a function of true air speed, latitude, and the relative bearing of the star being observed. The computer 70 also provides for a correction due to the effects of refraction and instrument errors. The corrected altitude signals $h$ is transferred to the differentiator 20 by means of the lead 72.

A space reference element 100 is rigidly secured to the vertical stabilizer 80 and the stabilized platform 2. In this manner any deviation of the platform is readily detected by the reference element 100. The space reference element 100 is designed to fulfill two functions: to provide positional information (latitude and longitude), and to serve as an invariant reference point against which to measure the rate of change of the bearing of a selected celestial body. The concept is somewhat analogous to a means for indicating time, such as a chronometer or electric clock. A time instrument must first be set by reference to some independent source; e.g., a time signal or another time piece. In the event of an interruption in power such as a run down spring or power failure the time piece must be re-energized and re-set. By the same principle the space reference element 100 must be oriented initially with reference to known positional data or by astronomical observations and data. If power is interrupted the reference element 100 loses track of its position and has to be reset. This resetting is done by the astro-tracker 1 and the related components. One form of space reference element could be a zero-drift inertial guidance system where the gyro will detect the slightest deviation or acceleration from a given point. This acceleration signal operates the differentiator 20' by way of the conductor 101.

Differentiators 20 and 20' may be any suitable highly accurate electronic differentiators or may be of the type shown in U.S. Patent No. 2,961,191.

The differentiators 20 and 20' are connected to the divider circuit 14 by the conductors 210 and 210'. This divider 14 operates on the signals $$\frac{dh}{dt}$$

and $$\frac{dZ}{dt}$$

to obtain the function $$\frac{dh}{dZ}$$

on the output lead 250. The divider 14 is connected to the mulitiplier 15 by the lead 250. The correction computer 70 is also connected to the multiplier 15 and the computer unit 40 by the conductor 73. The multiplier 15 operates on the two input functions $$\frac{dh}{dZ}$$

and $h$ to obtain an output function $$\tan M = \frac{dh}{dZ} \sec (h)$$

on the lead 251. This function is operated on by the computer 40. The value of the declination $d$ is put into the computer unit 40 by means of conductor 252.

The particular computer unit 40 forms no part of the invention and to facilitate the explanation of the device it has been shown in block form. The computer could be any device designed by conventional programing techniques for the purpose of solving a problem or group of functions. Any number of advanced programing manuals will explain the process involved. The computer unit also has the latitude and longitude destinations programed into it by means of the input leads 253 and 254 respectively.

An autopilot 61 is connected to computer unit 40 by conductors 255 and 256. This autopilot 61 will control the flight of the vehicle over the predetermined course and distance in response to the command signal from the computer unit 40.

The visual latitude display 90 and longitude display 91 are connected to the computer unit 40 by conductors 257 and 258 respectively and function in accordance with the information signals from the computer 40.

A conventional visual display compass 51 is also connected to the computer unit 40 by a conductor 259. The compass 51 also operates as an error checker by comparing the azimuth signal Z, which is obtained from computer 40, with the signal of the azimuth signal generator 60. The usual displays of compass heading, and the visual latitude and longitude displays primarily serve as an information aid to the pilot.

In operation, the astro-tracker 1 will track on a single star and more particularly the star would be the sun. For this reason the operation of the navigational tracking device will be explained in relation to the sun.

As an illustration, consider the relative motion of the sun and the earth. The sun appears to rise in the east, transits a local meridian, reaches a maximum altitude, then sinks in the west as viewed from a point on earth. When the observer is north of the sun, it will appear on the left (east) and at first will apparently increase in altitude very rapidly while the horizontal component or azimuth appears to move very slowly to the right. As the sun approaches the meridian the altitude will increase more slowly while the azimuth will increase more rapidly. When the sun is at the meridian the apparent rate of change in altitude is zero and the rate of change of the azimuth is at a maximum. As the sun starts to sink, the rate of decrease in altitude becomes more rapid and reaches a maximum when the sun sets. The rate of change of the azimuth goes from a maximum to a minimum during the period of setting.

In practice the astro-tracker would be aligned with the sun either automatically or manually when it is sufficiently above the horizon to give an accurate reading. The motors would bring the astro-tracker 1 into approximately the correct center alignment with the sun. From this discussion it is seen that the approximate value of Z is 90° and the aproximate value of $h$ is 0.

The signals from astro-tracker 1 would cause the control circuit 20 to speed up or slow down the servos 30 and 50 until a null was reached. This is known as "aided tracking." The altitude increase approximately sinusoidally and the altitude servo 30 would receive signals constantly but in minute increments (0.1 min. of arc). The azimuth servo 50 would receive similar signals. This would happen throughout the day if the sun was obscured momentarily the tracker 1 would continue at the last designated rate.

The differentiators 20 and 20' then convert the rate signal from the correction computer 70 and the sensitive reference element 100. The outputs from these differentiators are divided by circuit 14 to obtain the function $dh/dZ$. The altitude signal $h$ and the function $dh/dZ$ are operated on by the multiplier 15 to obtain the function:

(1) $$\tan M = \frac{dh}{dZ} \sec (h)$$

where:

$M$ = position angle of body)
$h$ = altitude
$Z$ = azimuth
$D$ = declination

Figure 2:
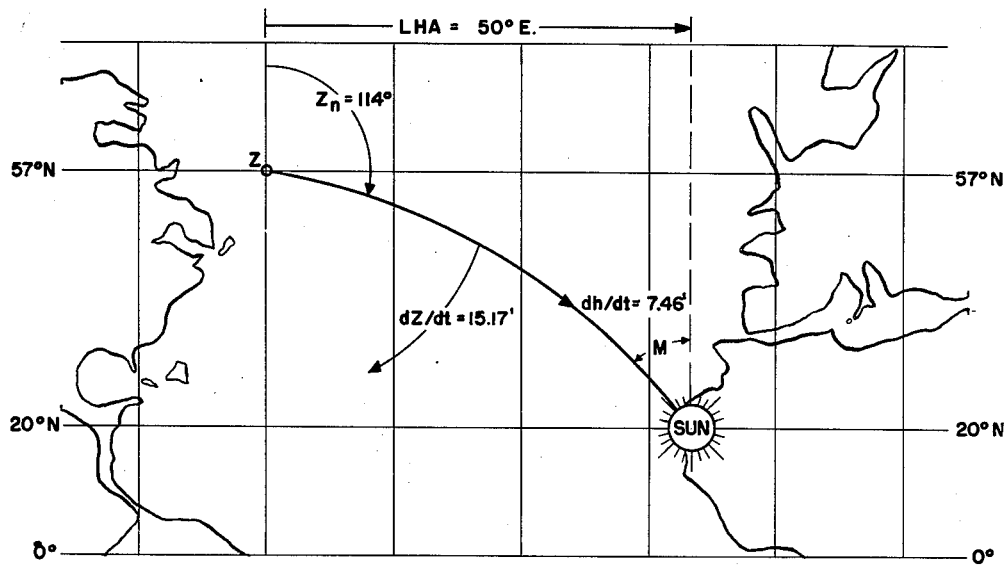
FIGS. 2 and 3 are diagrams to facilitate the explanation of the system.

Given the value of altitude $h$, declination D and angle M the computer unit 40 can solve for latitude and longitude by the following formulas:

(2) $\sin (\text{lat.}) = \sin (h) \sin (D) + \cos (h) \cos (D) \cos (M)$ (3) $\quad \sin (t) = \sin (M) \cos (h) \sec (\text{lat.})$
$\quad \text{long.} = t \pm \text{G.H.A.}$ (From Air Almanac)
$\quad \text{G.H.A.} = \text{GREENWICH HOUR ANGLE}$ (4) $\quad \sin (Zn) = \sin (t) \cos (D) \sec (h)$
$\quad Zn = \text{azimuth angle}$ The method of finding position from the formulas is as follows: From a fixed position Z in latitude 57° N. the altitude $h$ of the sun will be set at 38° 00'.7 and the azimuth (Zn) will be 114° when its declination $d$ is 20° N. and its local hour angle (LHA) is 50° E. as shown in FIG. 2.

The rate of change of altitude $$\frac{dh}{dt}$$

over an interval of 8 minutes of time will be 7.46' per minute and the rate of change of the azimuth $$\frac{dZ}{dt}$$

will be 15.17' per minute. This is determined as follows:

| LHA | Altitude | | Azimuth | |
|---|---|---|---|---|
| 49° | 38°30'.4 | | 115°00'.4 | |
| 50° | | 38°00'.7 | | 114°00'.0 |
| 51° | 37°30'.7 | | 112°59'.0 | |
| difference = | 59'.7 | | 121'.4 | |
| rate of change = | $\frac{59.7'}{8} = \frac{7'.46}{\text{min.}}$ | | $\frac{121.4}{8} = \frac{15'.17}{\text{min.}}$ | |

The ratio of $$\frac{dh}{dt} \text{ to } \frac{dZ}{dt} = \frac{dh}{dZ} = \frac{7'.46}{15'.17} = 0.49176$$

Figure 3:
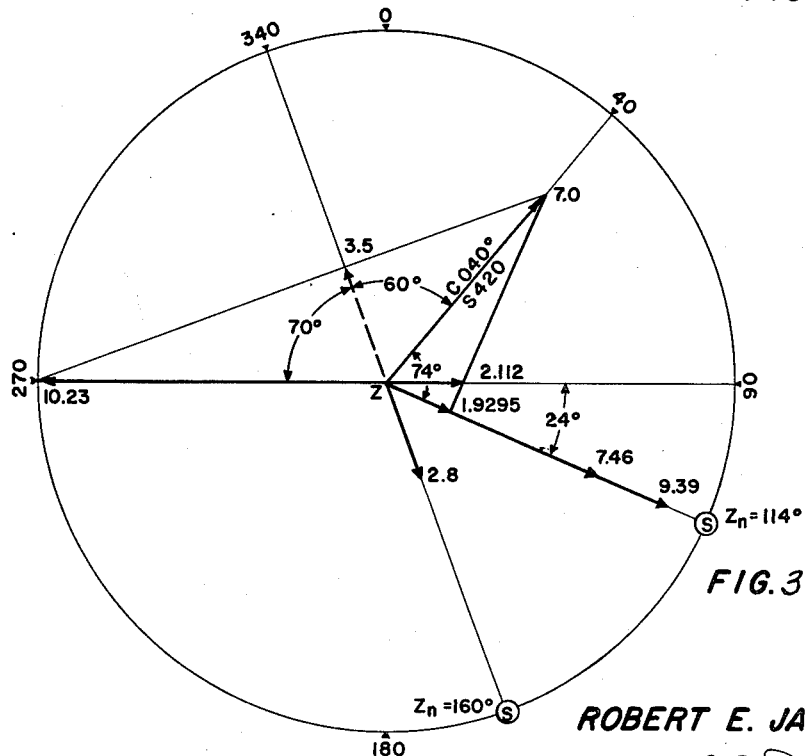

From a vehicle at point Z on course 40° and at a speed of 420 knots (FIG. 3) at the same instant as above, the rate-of-change of the relative altitude of the sun due to vehicular motion will be:

$$\frac{420}{60} \cos 74° = 7(0.27564) = \frac{1.9295'}{\text{min.}}$$

The combined rate-of-change of the altitude of the sun is:

$$\frac{dh}{dt} = \frac{7'.46}{\text{min.}} + \frac{1'.9295}{\text{min.}} = \frac{9'.39}{\text{min.}}$$

The velocity of the vehicle to the east is (Ve) is equal to $$\frac{1'.9295}{\cos 24°} = \frac{2'.112}{\text{min.}}$$

Since the earth rotates to the east at the rate of 15'/min. the total rate-of-change of the azimuth may be found from the equation:

$$\frac{dZ}{dt} = 15'.17\left(\frac{15+Ve \sec L}{15}\right) = 15'.17\left(\frac{15+3.878}{15}\right) = \frac{19'.09}{\text{min.}}$$

The ratio of $$\frac{dh}{dt} \text{ to } \frac{dZ}{dt} = \frac{dh}{dZ} = \frac{9.39}{19.09} = 0.49188$$

When the local hour angle of the sun reaches 13° E., the altitude will be 51° 46'.1 and the azimuth will be 160° to an observer at a stationary point Z as can be seen from FIG. 4. The ratio of $$\frac{dh}{dZ}$$

is found by the same method as previously explained and is equal to:

$$\frac{dh}{dZ} = \frac{2.8}{22.4} = 0.12500$$

From a point on the vehicle at the same instant due to relative motion of the vehicle alone, the rate-of-change of the sun's altitude will be:

$$\frac{Ve}{60} \cos 60° = 7(0.5) = \frac{3'.5}{\text{min.}}$$

The combined rate-of-change of the sun's altitude will be:

$$\frac{dh}{dt} = 2'.8 - 3'.5 = -\frac{0'.7'}{\text{min.}}$$

The velocity of the vehicle east with respect to the sun is equal to:

$$\frac{3.5}{\cos 70°} = -\frac{10'.23}{\text{min.}}$$

and $$\frac{dZ}{dt} = 22.4\left(\frac{15-10.23 \sec 57°}{15}\right) = \frac{5'.6}{\text{min.}}$$

The ratio:

$$\frac{dh}{dZ} = \frac{0'.7}{5'.6} = 0.12500$$

In the astronomical triangle the position angle (M) may then be determined from the equations:

$$\sin M = \sin (t) \cos (L) \sec (h)$$

or $$\tan M = \frac{dh}{dZ} \sec (h)$$

In the first example of a sun position above:

$$\sin M = \sin 50° \cos 57° \sec 38°00'.7$$

$$M = 31°51'.5$$

or $$\tan M = (0.49182)(1.2692)$$

$$M = 31°58'.5$$

In the second example given above:

$$\sin M = \sin 13° \cos 57° \sec 51°46'.1$$

$$M = 11°.25'.1$$

or $$\tan M = (0.125)(1.616)$$

$$M = 11°.25'.1$$

The remaining elements of the astronomical triangle may be obtained in accordance with the following equations:

$$\sin (\text{lat.}) = \sin (h) \sin (d) + \cos (h) \cos (d) \cos (M)$$

$$\sin (t) = \sin M \cos (h) \sec (\text{lat.})$$

$$\text{LONGITUDE} = \text{G.H.A.} \pm t$$

$$\sin Zn = \sin (t) \cos (d) \sec (h)$$

These equations would be solved automatically and the desired information obtained in the manner as previously described.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed as:

1. A navigation device comprising a stabilized platform, an astro-tracker connected to said stabilized platform, control means connected to said astro-tracker being adapted to follow one star, signal means connected to said astro-tracker for determining the altitude of the star, and means responsive to the altitude of the star for determining the geographic position of said stabilized platform.

2. An automatic one-star-tracking navigation device comprising, a stabilized platform, a radiometric sextant which is adapted to scan the periphery of the earth, said radiometric sextant being operatively connected to orient said stabilized platform normal to a vertical axis originating at the center of the earth, an astro-tracker connected to said platform, control means connected to said astro-tracker, said control means adapted for controlling the position of said astro-tracker to continually follow the sun, first signal means, said first signal means being connected to said astro-tracker control means to generate a signal corresponding to the altitude of the sun relative to the stabilized platform, second signal means connected to said astro-tracker to indicate horizontal movement of the astro-tracker with reference to the stabilized platform, a space reference element connected to said stabilized platform and said astro-tracker to detect deviation of the astro-tracker from a predetermined vertical bearing plane and to detect deviation of the stabilized platform from a predetermined reference point in space, a correction computer connected to the first signal means adapted to correct the altitude signal, first and second differentiator means, said first differentiator being connected to said correction computer to differentiate the corrected altitude signal, said second differentiator being connected to said space reference element to differentiate the bearing signal, a divider connected to said differentiators to divide the derivative of the bearing signal by the derivative of the corrected altitude signal, a multiplier connected to said divider and said correction computer to operate on the corrected altitude signal and the quotient of the derivative signals, a computer unit, a source of declination signals, said computer unit being connected to said source of declination signals, said multiplier and said correction computer, said computer unit being adapted to control an autopilot, and a geographic position display, a compass connected to said computer unit and said second signal means, said compass being adapted to detect error between the horizontal movement signal of the astro-tracker and an azimuth signal generated by the computer unit.

3. An automatic one-star tracking navigation device comprising:

an astro-tracker;

control means to position the tracker with relation to a single celestial body;
signal generating means connected to said control means to indicate the angular position of the astro-tracker;
means to differentiate the angular position signal;
stabilizing means connected to said astro-tracker; and
computing means responsive to the angular position signal and its derivative to determine the geographic position of the system.

4. An automatic one-star tracking navigation device comprising:
a stabilized platform;
an astro-tracker mounted on the platform;
feedback means to control the astro-tracker to continuously follow a single celestial body;
means connected to the astro-tracker to provide a signal representative of the angular position of the astro-tracker relative to the plane of the stable platform; and
means responsive to the angular position of the astro-tracker for providing the geographic position of the platform.

5. The system of claim 4 further including
a space reference element connected to the stable platform to provide a signal representative of the bearing celestial body being tracked; and
wherein the means for providing the geographic position of the platform includes
means to differentiate the signal representative of the angular position of the optical tracker;
means to differentiate the bearing signal;
means connected to the differentiators to provide a signal representative of the quotient of the two derivatives; and
means responsive to the angular position signal and to the quotient of the derivatives to provide a trigonometric function thereof.

6. The system of claim 5 further including vertical stabilizing means connected to the stable platform comprising
rotating means including a radiometric sextant for determining a vertical axis to the center of the earth; and
means to orient the stable platform normal to the vertical axis.

References Cited by the Examiner
UNITED STATES PATENTS

| | | | |
|---|---|---|---|
| 2,740,961 | 4/56 | Slater | 33—61 |
| 2,762,123 | 9/56 | Schultz | 235—187 |
| 2,921,757 | 1/60 | Houle | 244—14 |
| 3,048,352 | 8/62 | Hansen | 250—203 |

MALCOLM A. MORRISON, *Primary Examiner.*
WALTER W. BURNS, JR., *Examiner.*